(12) United States Patent
Humphris et al.

(10) Patent No.: US 9,291,641 B2
(45) Date of Patent: Mar. 22, 2016

(54) PROBE ACTUATION

(71) Applicant: INFINITESIMA LIMITED, Abingdon (GB)

(72) Inventors: Andrew Humphris, Oxfordshire (GB); Bin Zhao, Oxford (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

(21) Appl. No.: 14/375,552

(22) PCT Filed: Jan. 29, 2013

(86) PCT No.: PCT/GB2013/050194
§ 371 (c)(1),
(2) Date: Jul. 30, 2014

(87) PCT Pub. No.: WO2013/114099
PCT Pub. Date: Aug. 8, 2013

(65) Prior Publication Data
US 2015/0013035 A1  Jan. 8, 2015

(30) Foreign Application Priority Data

Jan. 31, 2012 (GB) .................................. 1201640.8

(51) Int. Cl.
*G01Q 20/02* (2010.01)
*G01Q 10/04* (2010.01)
*G01Q 10/00* (2010.01)

(52) U.S. Cl.
CPC ............... *G01Q 20/02* (2013.01); *G01Q 10/00* (2013.01); *G01Q 10/045* (2013.01)

(58) Field of Classification Search
USPC ...................... 850/1, 2, 3, 4, 5, 6, 7
See application file for complete search history.

(56) References Cited

U.S. PATENT DOCUMENTS

| 6,330,824 | B1 | 12/2001 | Erie et al. | |
|---|---|---|---|---|
| 2005/0117163 | A1* | 6/2005 | Ng | G01Q 20/02 356/501 |
| 2008/0011065 | A1 | 1/2008 | Su | |

(Continued)

FOREIGN PATENT DOCUMENTS

EP  1 684 414 A1  7/2006

OTHER PUBLICATIONS

Marti, O. et al., "Mechanical and thermal effects of laser irradiation on force microscope cantilevers", Ultramicroscopy 42-44 (1992) 345-350, North-Holland.

(Continued)

*Primary Examiner* — Nicole Ippolito
(74) *Attorney, Agent, or Firm* — Hauptman Ham, LLP (57) ABSTRACT

A method of driving a probe of a scanning probe microscope. The intensities of first and second radiation beams are modulated; and the beams are directed simultaneously onto the probe whereby each beam heats the probe and causes the probe to deform, typically by the photothermal effect. The optical system is arranged to direct the centers of the beams onto different locations on the probe. This enables the location of each beam to be chosen to optimize its effect. A lens receives the first and second beams and focuses them onto the probe. A beam combiner is arranged to receive and combine the beams and direct the combined beams towards the probe.

20 Claims, 5 Drawing Sheets

(56) References Cited

U.S. PATENT DOCUMENTS

2009/0032706 A1     2/2009   Prater
2014/0026263 A1     1/2014   Humphris

OTHER PUBLICATIONS

Ramos, D. et al.,"Photothermal excitation of microcantilevers in liquids", Journal of Applied Physics 99, 124904 (2006).

Allegrini, M. et al.,"Laser thermal effects on atomic force microscope cantilevers", Ultramicroscopy 42-44 (1992) 371-378, North-Holland.

Fu, Hao et al., "Selective photothermal self-excitation of mechanical modes of a micro-cantilever for force microscopy", Applied Physics Letters 99, 173501 (2011).

Yamashita, Hayato et al., "Tip-sample distance control using photothermal actuation of a small cantilever for high-speed atomic force microscopy", Review of Scientific Instruments 78, 083702 (2007).

Stahl, Stefan W. et al., "Photothermal cantilever actuation for fast single-molecule force spectroscopy", Review of Scientific Instruments 80, 073702 (2009).

Kiracofe, Daniel et al.,"High efficiency laser photothermal excitation of microcantilever vibrations in air and liquids", Review of Scientific Instruments 82, 013702 (2011).

Nishida ,Shuhei et al.,"Photothermal excitation of a single-crystalline silicon cantilever for higher vibration modes in liquid", J. Vac. Sci. Technol. B, vol. 27, No. 2, pp. 964-968, Mar./Apr. 2009.

International Search Report mailed Mar. 22, 2013 in International Application No. PCT/GB2013/050194, filed Jan. 29, 2013.

Written Opinion mailed Mar. 22, 2013 in International Application No. PCT/GB2013/050194, filed Jan. 29, 2013.

\* cited by examiner

FIG. 8

PROBE ACTUATION

RELATED APPLICATIONS

The present application is a National Phase of International Application Number PCT/GB2013/050194 filed Jan. 29, 2013, and claims priority from Japanese Application Number 1201640.8, filed Jan. 31, 2012.

FIELD OF THE INVENTION

The present invention relates to a method of driving a probe of a scanning probe microscope, and apparatus for use in such a method.

BACKGROUND OF THE INVENTION

H. Yamashita, T. Uchihashi, N. Kodera, A. Miyagi, D. Yamamoto, and T. Ando, "Tip-sample distance control using photo-thermal actuation of a small cantilever for high-speed atomic force microscopy", Rev. Sci. Instrum. 78:083702 (5 pages) (2007) describes an atomic force microscope (AFM) in which photothermal bending of a cantilever is induced by an intensity-modulated infrared laser. A red laser is also used to detect deflection of the cantilever. Both lasers are focused onto the cantilever by an objective lens.

A problem with such an arrangement is that it can be difficult to control the bending of the probe accurately and with a large range of motion.

SUMMARY OF THE INVENTION

A first aspect of the invention provides an actuation system for driving a probe of a scanning probe microscope, the system comprising: an optical system arranged to illuminate the probe at two or more locations on the probe; and a modulation system arranged to modulate the intensity of the illumination differently at the two or more locations.

A second aspect of the invention provides a method of driving a probe of a scanning probe microscope, the method comprising: illuminating the probe at two or more locations on the probe so as to cause the probe to deform; and modulating the intensity of the illumination differently at the two or more locations.

Preferably the illumination of the probe causes it to heat and deform by the photothermal effect. The term "photothermal effect" is used herein to refer in general terms to the deformation of the probe caused by the heating of the probe, such heating of the probe being induced by its illumination. Alternatively the illumination of the probe may cause it deform by some other mechanism such as by radiation pressure. Radiation pressure can be used in combination with highly reflective probe coatings and ideally some form of cavity, possibly a mirror attached to the probe.

The illumination of different locations on the probe enables the location of each illumination or spot to be chosen to optimise its effect. For instance the probe may have a relatively wide proximal portion adjacent to a probe support and a relatively narrow distal portion remote from the probe support; wherein the optical system is arranged to illuminate the proximal portion of the probe and the distal portion of the probe. As another example one or both of the illumination locations might be positioned at a node or anti-node of a particular mode of oscillation (flexural or torsional). For example the probe may have a T-shape with a cross bar at its distal end, with one illumination location on each opposite end of the cross bar, and the modulation system is arranged to modulate the intensity of the illumination 180 degrees out of phase at the two illumination locations.

The illumination locations may partially overlap on the probe but more preferably they do not overlap on the probe.

In one embodiment the optical system is arranged to move a single beam so as to sequentially illuminate the probe with the beam at the two or more locations on the probe. In this case the optical system typically comprises a lens arranged to receive the beam and direct or focus it onto the probe; and an electro-optical-modulator (EOM) or an acousto-optical-modulato (AOM) which is arranged to sequentially vary the angle of incidence at which the beam enters the lens relative to its optical axis. In another embodiment the optical system is arranged to simultaneously illuminate the probe at the two or more locations on the probe via two or more beams.

The illumination locations on the probe may be illuminated by different beams directed by different lenses, but more preferably the optical system comprises a lens arranged to receive first and second beams and direct or focus them onto the probe at different locations. Preferably the first and second beams enter the lens at different angles of incidence relative to its optical axis whereby they are directed or focused by the lens onto the probe at different locations. The first and second beams are preferably collimated as they enter the lens. Alternatively each of the first and second beams may be non-collimated (for instance divergent) as it enters the lens. In this case then the angle of incidence of each beam can be defined as its average angle of incidence (averaged across the width of the beam) and the first and second beams enter the lens at different average angles of incidence relative to the optical axis of the lens.

The diameter of each beam may be greater than half or greater than 25% of the diameter of an entrance pupil of the lens. Alternatively the diameter of each beam may be of the order of 10% of the diameter of the entrance pupil of the lens. Typically the beams overlap within the entrance pupil of the lens.

A tracking system may be provided for moving one or more illumination beams so as to track movement of the probe, typically in an XY plane which is approximately orthogonal to the beam(s), thereby maintaining the locations at which the probe is illuminated. The tracking system may use a moving lens to track the probe. However this may cause problems due to chromatic aberration of the lens, in particular when different wavelength light passes through the lens. Also the lens may be heavy, making it difficult to move quickly and limit the speed of operation of the microscope. Therefore preferably the optical system comprises a lens arranged to receive one or more beams and focus them onto the probe; and a tracking system arranged to vary over time the angles of incidence at which the beam(s) enter(s) the lens relative to its optical axis. Typically the tracking system is arranged such that different beams enter the lens at different angles of incidence relative to its optical axis whereby they are focused by the lens onto the probe at the different locations. Typically the tracking system comprises a beam steering mirror arranged to reflect the beam(s) towards the lens; and a mirror actuator arranged to rotate the beam steering mirror (by tipping or tilting the mirror).

Alternatively the probe may remain stationary in the XY plane in which case no optical tracking system is required. In this case relative XY motion between the probe and a sample being scanned by the probe can be generated by motion of the sample rather than motion of the probe.

Typically a beam combiner is arranged to receive and combine beams and direct the combined beams towards the probe. Typically the beams have different characteristics (such as different wavelengths or more preferably different polarisations) such that the beam combiner reflects one of the beams and transmits the other. Providing beams with different polarisations is preferred since it enables them to have the same wavelength (or at least a similar wavelength) which is chosen to efficiently heat the probe.

Preferably the first and second illumination locations are illuminated with radiation at the same wavelength, which may be chosen to efficiently heat the probe or cause it to deform by some other mechanism such as radiation pressure.

Preferably the probe scans a sample, by moving the probe over the surface of the sample and/or by moving the sample relative to the probe, and the modulation system is arranged to modulate the intensity of the illumination at one or more of the two or more locations as the probe scans the sample. For example the intensity of the illumination at one of the locations may be modulated in response to a measured probe sample interaction so that the probe follows a profile of the surface of the sample.

The optical system is arranged to illuminate the probe at two or more locations on the probe, typically providing two or more illumination spots on the probe. The modulation system is arranged to modulate the intensity of the illumination at each of the two or more locations, and to modulate the intensity of the illumination differently (and preferably independently) between the different locations. Typically the intensity of the illumination is modulated at a first one of the locations in accordance with a first drive signal and at a second one of the locations in accordance with a second drive signal.

In a first example one of the spots is used to oscillate the probe at a substantially constant and relatively high frequency, and the other spot is used to deflect the probe irregularly to track the profile of a sample being scanned. In a second example one of the spots is used to oscillate the probe at a substantially constant and relatively high frequency, and the other is used to select the probe by lowering it out of the plane of an array of probes in order to move the selected probe towards a sample being scanned by the selected probe so that the selected probe can interact with the sample, the other probes in the array remaining unselected, in the same plane, and not interacting with the sample as the sample is scanned by the selected probe. In a third example one of the spots is used to excite a first mode of oscillation of the probe (for instance a first flexural mode) and the other is used to excite a second mode of oscillation (for instance a second flexural mode with a higher frequency than the first flexural mode, or a torsional mode). Thus in general terms the intensity of the illumination is typically modulated with different (non-zero) frequencies at the two or more locations (where these frequencies may vary over time).

Optionally the probe may be shaped differently at the two or more illumination locations in order to match the function being performed by the illumination. For instance the width and/or thickness of the probe may be different at the two or more locations where it is illuminated.

It is preferable due to the probe fabrication process for the probe (and each layer of the probe where the probe has multiple layers) to have a uniform thickness along its length. However, the probe may have a thickness which varies along its length. For example the probe may have a relatively thick base (including a relatively thick metal layer) and a relatively thin distal end (including a relatively thin metal layer).

A third aspect of the invention provides an actuation system for driving a probe of a scanning probe microscope, the system comprising: a modulation system arranged to modulate the intensities of first and second radiation beams; and an optical system arranged to simultaneously direct the beams onto the probe.

A fourth aspect of the invention provides a method of driving a probe of a scanning probe microscope, the method comprising: generating first and second radiation beams; modulating the intensities of the first and second radiation beams; and simultaneously directing the beams onto the probe. Preferably each beam heats the probe and causes the probe to deform by the photothermal effect.

The third and fourth aspects of the invention provide an improved system and method in which two modulated radiation beams are used to drive the motion of the probe instead of one, enabling the probe to be driven with higher power than in Yamashita et al, thus enabling the intensity and modulation bandwidth of the probe illumination to be increased.

The beams may be centred on the same location on the probe. However more preferably the optical system is arranged to direct the centres of the beams onto different locations on the probe. This enables the location of each beam to be chosen to optimise its effect.

The intensities of the beams may be modulated identically, particularly if they are directed to the same location on the probe. However more typically the modulation system is arranged to modulate the intensity of the first radiation beam differently (and preferably independently) from the intensity of the second beam. Typically the intensity of the first beam is modulated in accordance with a first drive signal and the intensity of the second beam is modulated in accordance with a second drive signal.

A further aspect of the invention provides an actuation system, and associated method, for driving a probe of a scanning probe microscope in which an optical system is arranged to move a beam so as to sequentially illuminate the probe with the beam at two or more locations on the probe so as to cause the probe to deform; and a modulation system is arranged to modulate the intensity of the beam. The beam may be scanned over the probe for the purpose of distributing energy over a wide area.

The following comments relate to all aspects of the invention.

The deformation of the probe may be a bending, twisting, or any other motion of the probe caused by the photothermal effect.

A tracking system may be provided for moving the (or each) beam so as to track movement of the probe, thereby maintaining the location(s) on the probe at which the (or each) beam is directed.

The tracking system may comprise a beam steering mirror which reflects the beam towards the lens; and a mirror actuator for rotating the beam steering mirror (by tipping or tilting the mirror).

The actuation system may be provided as part of a scanning probe microscope comprising a probe. The probe may comprise a single material, or it may comprise two or more materials with different thermal expansion coefficients which are arranged so that the (or each) beam heats the probe and causes the probe to deform by the photothermal effect.

The scanning probe microscope may be used in a number of applications, including (but not limited to): material science and biological research, industrial inspection, semiconductor wafer and mask inspection and review; biosensing to detect multiple biomarkers; nanolithography, such as, dip pen nanolithography in which scanning probes deposit chemical compounds on a substrate; or data storage in which the probe has a heater allowing its temperature to be independently raised to melt a polymer substrate followed by an imprinting action by the probe producing a dent representing a binary digit.

Typically the scanning probe microscope is operated to obtain information from a sample scanned by the probe (scanning motion being achieved by moving the probe and/or moving the sample). The information obtained from the sample may be topographic information or any other kind of information (such as chemical and mechanical information about the sample or surface of the sample). The probe and microscope may be further adapted to measure other sample properties, such as magnetic or electric fields, via suitable interaction forces. Alternatively the scanning probe microscope may be operated to manipulate or modify a sample with the probe, for instance by removing or adding material such as to deposit chemical compounds on the sample or store data on the sample.

Typically the intensity of the illumination is modulated at one or more of the locations as the probe interacts with a sample (for instance to obtain information from the sample or manipulate/modify the sample).

The microscope may comprise an image collection module for compiling an image of a sample scanned by the probe.

The microscope may comprise a detection system for detecting movement of the probe. Preferably the detection system uses a detection beam which is directed onto the probe by the same lens which directs the modulated spots onto the probe. Where a tracking system is provided, then preferably the tracking system moves the detection beam so as to track movement of the probe, thereby maintaining the location on the probe at which the detection beam is directed.

The detection system may be based on interferometry, in which the detection beam is combined with a reference beam to generate an interference pattern which provides a measure of a path difference or change in the path difference between the two beams and hence an indication of the instantaneous height of the probe.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
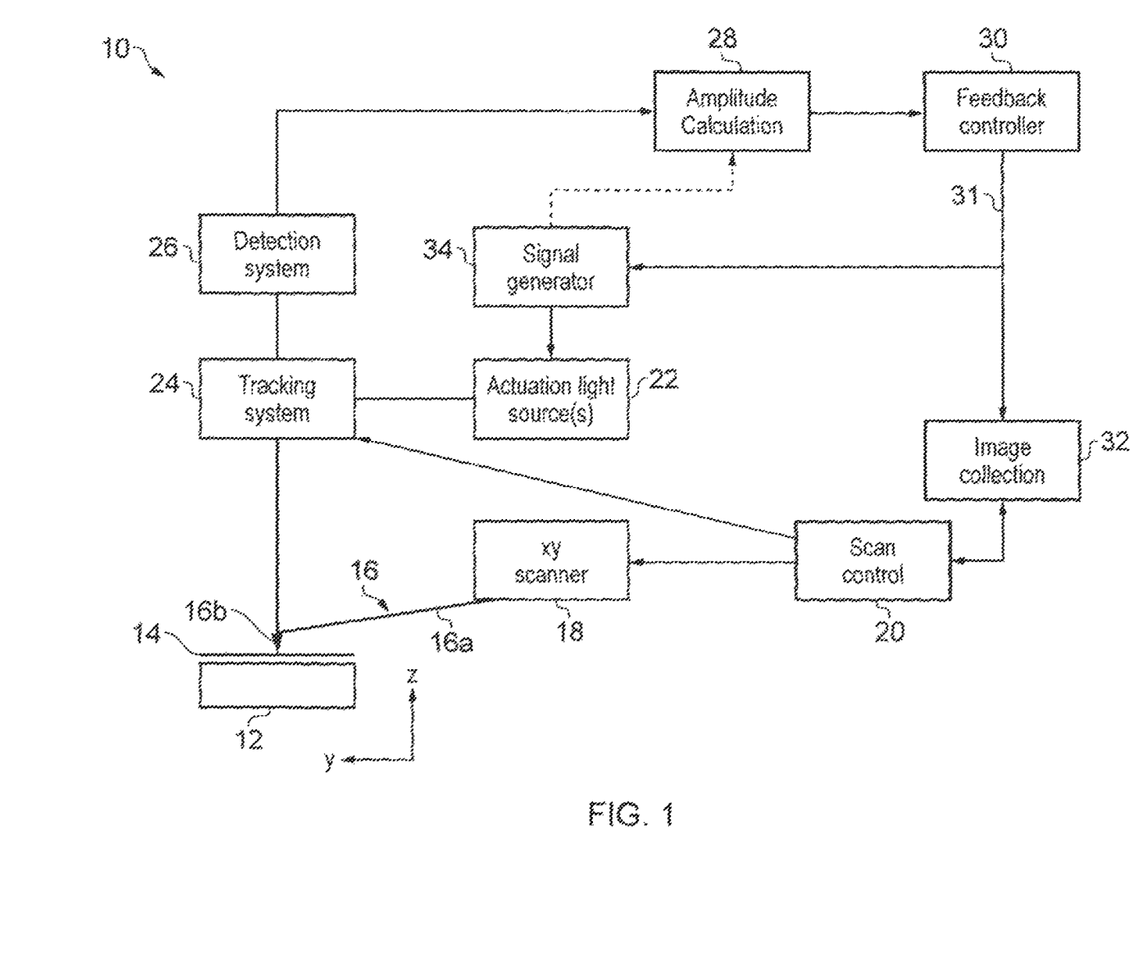
FIG. 1 is a schematic illustration of the components of an exemplary atomic force microscope that incorporates a z actuation system in accordance with an embodiment of the present invention.

With reference to FIG. 1, a novel microscope 10 that incorporates an embodiment of a z actuation system in accordance with the present invention is shown. The microscope 10 comprises a stage 12 on which a sample 14 to be investigated by a probe 16 is mounted. The probe 16 comprises a cantilever beam 16a and a tip 16b, which tapers to a fine point, and which is located towards a distal end of the cantilever beam. The other (proximal) end of the cantilever beam is fixed to a mount. The mount and probe 16 are connected to piezoelectric xy drivers 18 that are operable by a scan controller 20 to move the probe 16 across the sample surface in the plane (x,y) of the sample 14.

The cantilever 16a is of a type referred to as a thermal bimorph. That is, it is composed of two (or more) materials, with differing thermal expansions. Typically, this will be a silicon or silicon nitride base with a gold or aluminium coating. The coating extends the length of the cantilever 16a and covers the reverse side from the tip.

Actuation light sources 22 generate intensity-modulated radiation beams which are directed via a tracking system 24 onto the coated side of the cantilever. The wavelength of the light is selected for good absorption by the coating material. An optical system (not shown) directs the beams onto different locations on the cantilever 16a. The options for probe illumination and source arrangement will be discussed in more detail below. For the purposes of this overview, it suffices to understand that the bimorph probe 16 is illuminated in order to induce bending of the cantilever and so to adjust the z position of the tip.

A detection system 26 operates to collect a probe motion signal that is indicative of the deflection angle of the probe tip 16b. Within the detection system 26, a detection light source (not shown in FIG. 1) emits a light beam which is directed, via the tracking system 24, onto an upper surface (back) of the cantilever beam 16a at the end at which the tip is mounted. Light reflected from the back of the cantilever propagates to a deflection detector (not shown explicitly in this figure), typically a split photodiode, which generates an output that is representative of the deflection of the cantilever. Note that this light reflected from the back of the cantilever is not shown in FIG. 1, or FIG. 3a or 4, to simplify the drawings. The output of the detection system is analysed by a processor 28 to extract information relating to the amplitude of probe oscillation. The processor 28 may alternatively be operated to extract other parameters indicative of probe position, for example deflection or phase. A feedback controller 30, in response to the measured oscillation amplitude, outputs a feedback signal 31 that is used to instruct adjustment of probe position in order to maintain a constant oscillation amplitude on adjustment of the probe—sample separation. This adjustment of the probe position is referred to below as z-position feedback. An image collection processor 32 receives the feedback signal 31 from the feedback controller 30, which represents the information about the surface of the sample obtained by the microscope 10, and this, along with knowledge of the xy scan pattern, is used to construct a map of the sample 14. Typically the feedback signal and thus map provide height information about the surface of the sample.

As stated above, the cantilever 16a is a thermal bimorph structure, the materials of which undergo differential expansion when heated. In one embodiment, the cantilever 16a is fabricated from silicon nitride with an aluminium coating. The actuation light sources 22 emit light of one or more wavelengths at which there is a maximum or peak in the absorption spectrum for the particular coating. For example the wavelength may be around the aluminium absorption peak at ~810 nm. Other coating/wavelength combinations can be used, for example gold has a higher absorption below 500 nm light. When this light is incident on the coating side of the cantilever 16a, the aluminium expands to a greater degree than the silicon nitride, bending the cantilever such that the tip moves downwards, towards the sample. If illumination intensity is increased, the tip 16b therefore moves closer to the sample surface. Conversely, if the intensity is lowered, bending is decreased and the tip 16b is moved away from the sample.

Clearly other arrangements of coating and base materials may result in different levels of bending in the same or opposite direction in response to illumination. The actuation light sources 22 are controlled by a signal generator 34 that, in turn, is linked to the feedback controller 30. The signal generator 34 therefore is operable to control intensity of light emitted from the actuation light sources 22, which in turn determines the degree of bend exhibited by the thermal bimorph probe (regardless of its material specifics) and so governs the tip—sample separation distance during the course of a scan.

The intensity of light emitted from the actuation light sources 22 varies as the scan progresses in accordance with parameters that will be described later. Essentially, the actuation light sources 22 can be considered to provide the drive mechanism for two different types of probe control: the z position feedback described above and probe oscillation (described in more detail below). That is, it is set to drive oscillation of the probe and to adjust the probe—sample separation distance during the course of a scan.

In taking an image of the sample 14, the microscope is operated as follows. The signal generator 34 provides a source signal that oscillates at the desired frequency and amplitude. This signal, on input to the actuation light sources 22, causes one of the beams of light emitted by the sources to modulate its intensity in relationship to the waveform of the signal.

When this modulated light is incident on the cantilever 16a, it causes a flexing of the cantilever that varies with the intensity modulation. The probe tip 16b is therefore driven towards and away from the sample at a frequency and amplitude that, in free space, is the same as that of the drive signal. This drives the probe oscillation necessary for many atomic force microscope (AFM) applications. In a typical AFM operating in a dynamic mode the probe oscillation may be at or near resonance. Alternatively, the probe can be driven off-resonance, but still at a high frequency.

In operation, the probe 16 is irradiated by the modulated-intensity light beam, as described above, such that it oscillates with the desired free space amplitude. The signal generator 34 then, for example, increases its drive signal to one of the actuation light sources 22. This will be described in more detail below. In either case, the result is that the probe tip 16b is moved closer to the sample. The oscillation amplitude of the probe is reduced as the tip moves towards and interacts with the surface. Probe motion is monitored using the detection system 26. The output from the detection system 26 is passed to the processor 28, which extracts the amplitude of oscillation from the detector signal.

A feedback controller 30 calculates the difference between the observed amplitude of probe oscillation and that of the set point of the feedback controller 30. The controller 30 then generates a z feedback signal, which is used by the image collection processor 32 to construct the image of the sample surface. The z feedback signal is also input to the signal generator 34. The signal generator 34 then derives the instructional signal to be sent to one of the actuation light sources 22 to produce a remodulated output. The remodulated output results in a modulation of the bending pattern of the cantilever, effectively adjusting the z position of the tip in response to feedback as well as maintaining probe oscillation.

The xy scanner 18 drives the probe tip 16a across the surface of the sample, usually following a raster pattern. The scan controller 20 ensures that the tracking system 24 is matched with the scan pattern driven by the scanner 18 such that light from both the actuation sources 22 and the height detection system 26 maintain their position on the probe as it moves. The scan controller 20 may calculate different drive signals for the scanner 18 and tracking system 24 depending on their particular construction and mechanical behaviour. When the tip 16b encounters a part of the surface with, for example, increased height, its motion is changed and the monitored parameter, for example the amplitude of the probe oscillation, moves away from its set point. The feedback controller 30 is set to adjust the vertical position of the probe tip as controlled by one of the light sources 22 to move it away from the sample 14 and so to return the signal received from the detector 28 to its set point. The probe 16 is accordingly maintained in a position at which it has a constant average (over a number of oscillations) interaction with the surface.

Figure 2:
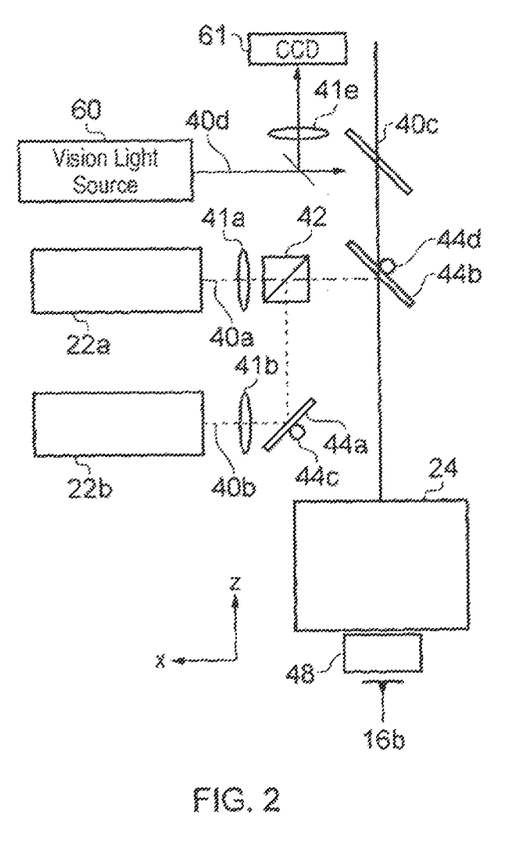
FIG. 2 illustrates the z actuation system of FIG. 1, showing details of a tracking system by which first, second and third laser beams are incident on localised regions of the probe, whilst the probe is scanned across a sample surface.

With reference now to FIG. 2, the features of the z actuation system 22, 24, 34 are shown in more detail. In this example the actuation light sources 22 comprise first and second lasers 22a, 22b that each emit light at the same infrared wavelength, around 810 nm. Light 40a from the first laser 22a is horizontally polarised, whilst the light 40b from the second laser 22b is vertically polarised. The output intensity emitted by both lasers 22a, 22b is independently under the control of the signal generator 34 via respective drive signals.

A polarising beam combiner 42 is arranged such that polarised light 40a, 40b from the two light sources incident at respective faces are directed to exit at a single output face. Specifically, the beam combiner 42 has an internal mirror 42a arranged at 45° relative to the beam 40a which reflects the S polarisation component of beam 40b but transmits the P polarisation component of beam 40a.

The fact that the beam 40b is S polarised and the beam 40a is P polarised is not to be taken as restrictive. Either polarisation can be used for either beam, or indeed circular polarisations. All that is required is that they are differently polarised in order for them to be combinable in the beam combiner.

A first motorised mirror 44a is steerable by a mirror actuator 44c about two orthogonal axes of rotation to ensure that light 40b from the second laser 22b enters the beam combiner 42 at the required angle and position. Thus the first mirror 44a can be adjusted so that the laser output beams 40a, 40b exit the combiner either substantially parallel or with a small angular difference—this angular difference being more apparent in FIGS. 3 and 4. A third laser beam 40c, for use with the height detection system 26, is also directed by appropriate optics (not shown) to a steering mirror system 46 which is discussed in further detail below.

A second motorised mirror 44b is oriented to direct the combined z actuation beams 40a, 40b towards the tracking system 24. The angle of the second mirror 44b can be adjusted with respect to two orthogonal axes by a mirror actuator 44d so that the laser output beams 40a, 40b enter the tracking system 24 with a small angular difference relative to the beam 40c so that the three beams 40a, b, c enter the tracking system 24 with a small difference in angle between them. When the probe 16 is scanned across the sample surface by the xy scanning system 18, the tracking system 24 is similarly scanned to ensure that the three beams 40a, b, c follow the probe xy position and yet retain their relative displacement.

On exiting the tracking system 24, the beams 40a, b, c are simultaneously focused by an objective lens 48 towards the back of the cantilever 16a. As the beams 40a, 40b, 40c enter the lens system 48 at different angles they are focused on respective laterally displaced locations on the cantilever 16a.

Figure 3A:
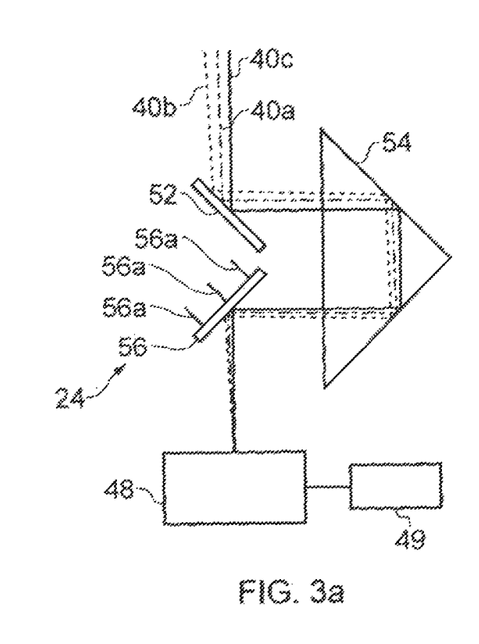
FIGS. 3a and 3b are enlarged views of the beam steering system illustrated in FIG. 2.
Figure 3B:
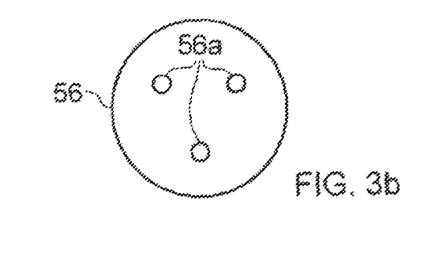

Details of the tracking system 24 are shown in FIGS. 3a and 3b. The beams 40a, 40b, 40c are reflected from a fixed mirror 52 towards a right-angle block 54. The right angle block is oriented such that the beam 40c is incident normally on the entry face. The relative angular displacement of the beams 40a, 40b, 40c is maintained by the right angle block 54. The beams 40a, 40b, 40c then propagate to an adjustable mirror 56 oriented at an angle to the beam 40c. The beams 40a, 40b, 40c are reflected from the mirror 56 towards the objective lens 48. The mirror 56 is mounted on three piezoelectric actuator struts 56a which are separated by 120° round the centre of the mirror as shown in FIG. 3a. The lengths of the three struts 56a can be adjusted together to translate the mirror, or at different rates to rotate or tilt the mirror about two orthogonal axes. That is, the angle of the mirror 56 can be adjusted about the two orthogonal axes by tilting the mirror 56. The rotation about the two orthogonal axes can be controlled independently. As the mirror 56 tilts, the reflected beams 40a, 40b, 40c rotate together, with the result that the angle and point of incidence of each beam is moved laterally across the objective lens 48. Synchronisation of the mirror 56 tilt with the scanning pattern followed by the probe 16 as it is driven by the xy scanner 18 means that the three incident beams 40a, b, c, each retain their position on the probe. The positions of the beams 40a, b, c on the probe are determined only by the angles of incidence of the beams into the lens 48 (and not their points of incidence) so the spacing between the spots on the probe does not change as the points of incidence into the lens change.

It will be appreciated by one skilled in the art that this tracking system 24 can be adapted to allow four, five or more light beams to track a moving cantilever.

Figure 4:
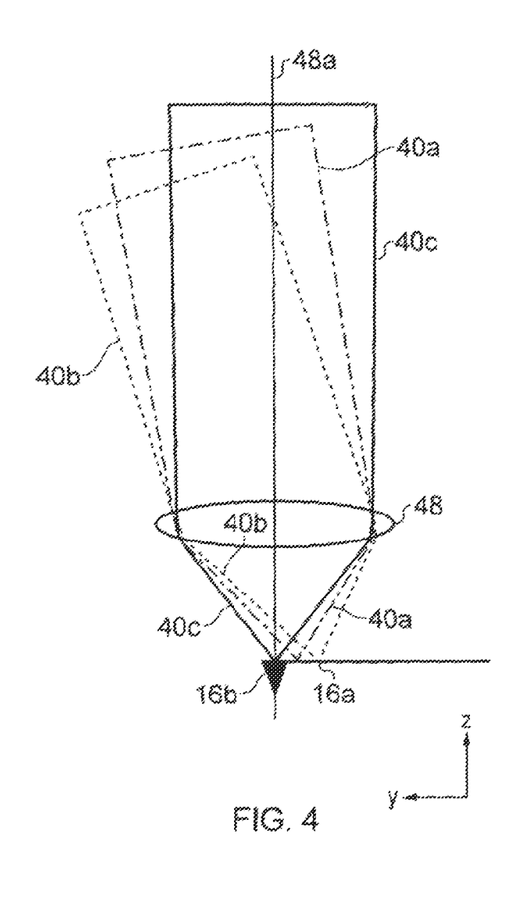
FIG. 4 is an enlarged view of the objective lens focusing three beams onto the cantilever.

FIG. 4 is a schematic view showing the objective lens 48 focusing the beams 40a-c into respective spots onto the cantilever 16a. Although the lens 48 is illustrated as a single lens element in FIG. 4, it will be understood that it may comprise an assembly of multiple lens elements. As discussed above the mirrors 44a, 44b are arranged such that the beams 40a-c enter the objective lens 48 at different angles of incidence relative to the optical axis 48a of the lens. As shown in FIG. 4, this results in the beams 40a-c being focused by the objective lens 48 onto the probe at different locations along its length. In this example the beam 40c is parallel with the optical axis 48a. Note that the beams 40a-c each have a diameter which is greater than a quarter of the diameter of the entrance pupil of the objective lens 48.

The optical system is an infinity optical system, so that the beams 40a-d are all collimated as they enter the objective lens 48 and the positions of the spots on the probe are only dependent on the angles of the collimated beams entering the objective lens 48 and not on their lateral positions. Optionally collimation lenses 41a,b may be provided to collimate the beams 40a,b if necessary. An infinity optical system is preferred because it enables the position of these lenses 41a,b to be adjusted and optical components added without affecting the formation of the spots on the cantilever. In an alternative embodiment (not shown) the optical system may be a finite optical system in which each beam is divergent as it enters the lens 48.

Figure 5:
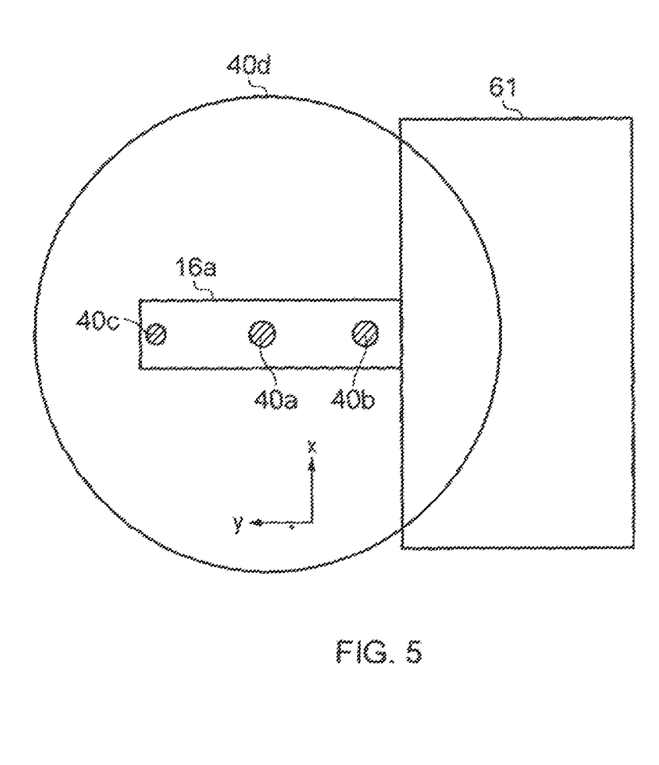
FIG. 5 shows schematically a cantilever, viewed from above, as it is illuminated by four separate light sources.

FIG. 5 shows schematically the spots on the cantilever 16a illuminated by the beams 40a-c. The centers of the spots are spaced apart, and the spots are non-overlapping. FIG. 5 also shows a large area illuminated by a beam 40d emitted by a vision system light source 60 shown in FIG. 2. This light source 60 is part of a vision system that enables optical alignment of the beams with the probe 16 prior to a scan being performed. Apart from the light source 60, the vision system also has a CCD camera 61, a partially reflective mirror, and a tube lens 41e to form the image on the CCD. The cantilever 16a is mounted on a substrate 61 and viewed from above (z direction).

The first spot, nearest the free distal end of the cantilever, is the incident position of the detection laser beam 40c. The detection laser beam 40c is an un-modulated beam which is used to detect the deflection of the back of the probe as the probe tip interacts with the sample surface. Accordingly, it should be positioned close to the tip 16b, on the reverse side of the cantilever. The tip 16b is, for most cantilever designs, towards the free distal end of the cantilever and so the detection laser beam 40c is similarly incident towards the free distal end.

The beam 40a is arranged to drive deflection of the probe (that is, it adjusts the probe—sample separation distance during the course of a scan in accordance with the z feedback signal 31) and illuminates the cantilever at a second spot located intermediate the free distal end and the proximal end/substrate 61. The beam 40b drives the oscillation of the probe during the course of a scan and is incident on the proximal end of the cantilever near to the interface of the cantilever 16a and the substrate 61. The spots formed by the beams 40a and 40b are shown as a similar size, but the illumination areas of the oscillation and deflection beams can be different.

The oscillation beam 40b and deflection beam 40a may be incident at different positions on the cantilever from those shown, although the locations illustrated are preferred. In particular, it has been found that oscillation of the cantilever is most efficiently excited by directing the oscillation beam 40b towards the base (proximal end) of the probe cantilever and near the substrate 61. This enables it to effectively drive the mechanical oscillation of the cantilever.

The large fourth spot is due to the illumination beam 40d for the camera 60 that is used to view the cantilever during set up. This can be optionally be turned off during a scan of a sample.

The tracking system 24 illustrated in FIG. 3 is arranged to track all four beams 40a-d together, maintaining their longitudinal alignment. In this way, they continue to illuminate the cantilever 16a, in the same relative orientation, as the probe is moved during the course of a scan.

Figure 6:
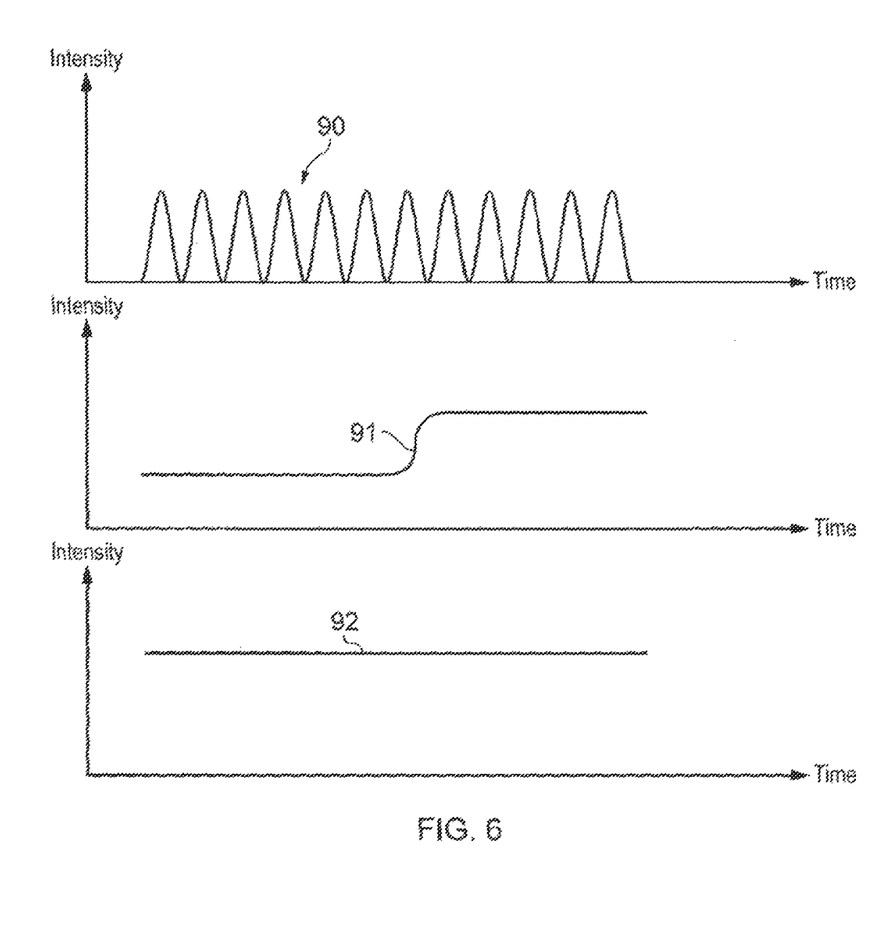
FIG. 6 shows the modulation intensity of the three actuation beams.

FIG. 6 is a graph showing the intensity modulation of the three beams 40a-c. The intensity of the oscillation beam 40b is modulated by the signal generator 34 in accordance with a first drive signal which is a sine wave 90 at a constant frequency, typically in the range of 10's of kHz to a few MHz, particular details depending on the microscope configuration, mode of operation and particular cantilever. The maximum amplitude of the oscillation of the probe tip 16b generated by the first drive signal is typically of the order of 10-200 nm. The intensity of the deflection beam 40a is modulated by the signal generator 34 in accordance with a second drive signal to maintain a constant oscillation amplitude of the probe so the tip 16b of the probe can track the profile of the sample, in this case changing the second drive signal at 91 as the tip 16b of the probe passes over a step in the sample. Typically the step has a size of the order of microns, so the amplitude of the deflection of the probe tip 16b caused by the second drive signal is typically an order of magnitude greater (that is, at least 10 times greater) than the amplitude of the deflection of the probe tip caused by the first drive signal. The detection laser beam 40c is un-modulated so has a constant intensity 92.

Figure 7:
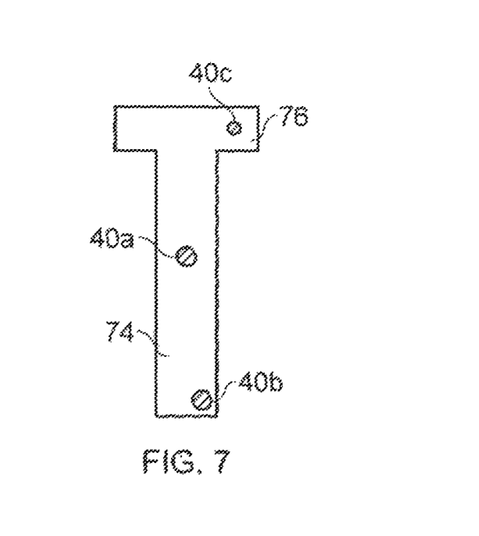
FIG. 7 shows the preferred positioning of three beams of the z actuation system on a different probe geometry.

FIG. 7 shows an alternative probe geometry. In this arrangement, the cantilever is T-shaped with a longitudinal arm 74 extending from the base to the free end and a transverse cross bar 76 at the free end. Although not visible from this plan view, the tip is asymmetrically located on and supported by the cross bar 76. By torsional oscillation it is meant that the cantilever is oscillated about its longitudinal axis to effect a twisting motion. In this way, the offset tip describes a small arc that moves it vertically towards and away from the sample surface. Torsional oscillation of a T-shaped probe may therefore be used as an alternative to flexural oscillation of a standard rectangular probe.

Vertical tip motion established by torsional oscillation offers several advantages over other modes when used in high speed microscope scanning. The torsional resonance is at a higher frequency than the flexural resonance. Ideally, the torsional oscillation frequency is around 0.5-5 MHz and the flexural spring constant is of the order 0.2-2 Nm−1 (these parameters can be controlled by adjusting the dimensions of the cantilever). This means that the rate at which the surface is sampled is higher for torsional operation. This can therefore be used to increase scanning speed or to improve the sensitivity of the detection of the tip-sample interaction forces. Another problem encountered in dynamic imaging is that, on occasion, a large error in the feedback system (arising, for example, from a sudden change in surface height) may result in a large force being applied to the surface as flexural bending (deflection) increases to accommodate the error in the sample—probe base separation. Use of the torsional mode of oscillation to provide the dynamic oscillation means that the stiffness of the flexural bending can be reduced, without any loss of dynamic functionality. This lessens the effect of errors on applied surface force and provides a greater displacement of the probe if flexural bending is required in addition to the torsional mode.

As with the rectangular probe design of FIG. 5, three separate laser beams are focused on the back of the T-shaped probe in order to excite torsional oscillation. As before, the detection laser beam 40c is focused to a spot above the tip of the probe. As the probe tip is offset along the cross bar 76, so too is the detection spot 40c. The oscillation beam 40b is again focused at the proximal end of the cantilever 74 at the interface between probe and substrate in order to ensure efficient coupling. In this embodiment however, the spot 40b is offset to the right of the cantilever longitudinal axis. An offset position is found to best excite torsional oscillation. The third beam 40a is again focused centrally on the cantilever, intermediate the detection and oscillation beams.

Figure 8:
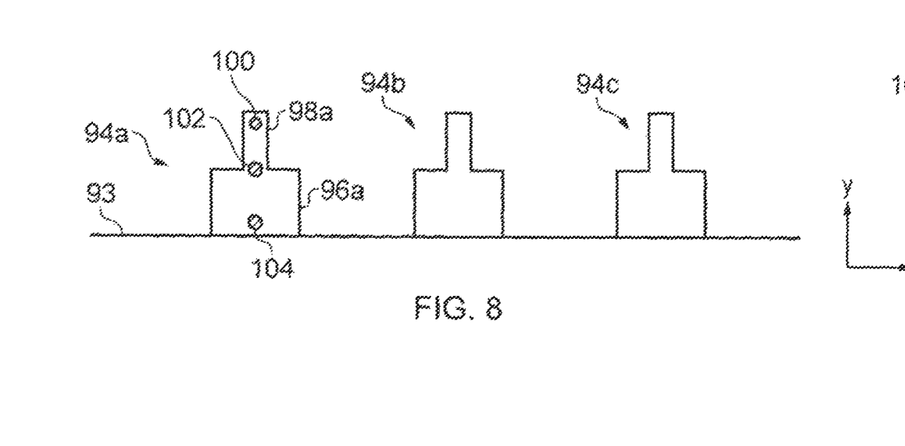
FIG. 8 is a schematic illustration of an alternative thermal bimorph probe design showing preferred positioning of three actuation beams of the z actuation system.

FIG. 8 shows an alternative design of probe that is responsive to the z actuation system of this invention. In this embodiment, a substrate 93 supports an array of three probes 94a-c. Each probe has a wider region 96a at the substrate end and a narrower region 98a that extends to the free end. Both regions 96a and 98a are coated with a material of different thermal expansivity from the base material.

In this embodiment, a first illumination spot 100, above the position of the tip, is formed by the detection laser. This spot 100 does not drive probe movement. A second spot 102 is focused at the interface between the two sections 96a, 98a of the cantilever. This interface is again an effective coupling site for photothermal energy to excite mechanical oscillations. This spot 102 is accordingly from the laser that drives probe oscillation. A third spot 104 is focused on the section 96a of the probe, towards the substrate 92. This laser beam is responsible for probe selection. That is, it is focused on one of the probes 94a-c in order to lower it out of the plane of the other probes and so select that probe to carry out a scan. As before, the beam tracking system ensures that all beams maintain a fixed position relative to the probe as it is scanned across a sample. Deflection of the probe to follow the profile of the sample in the first embodiment is driven by a deflection beam 40a. In the case of FIG. 8 this profiling deflection can be driven by a fourth spot (not shown) between the spots 100 and 102; by the spot 104 (in addition to its probe selection function); or by another actuation mechanism such as a piezoelectric actuator.

Figure 9:
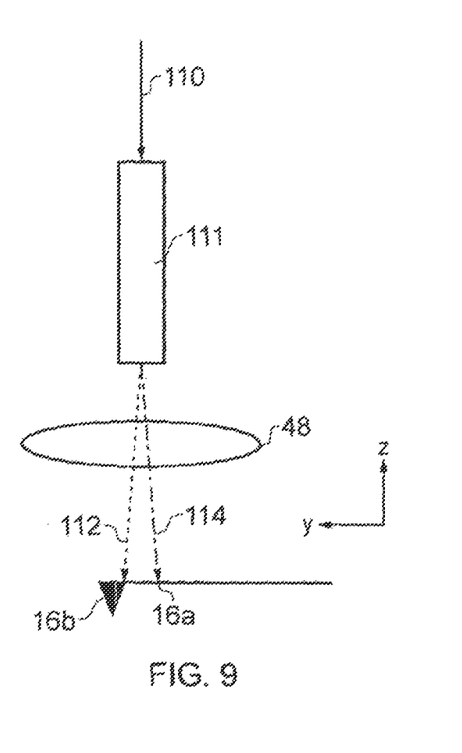
FIG. 9 is a schematic illustration of an alternative z actuation system incorporating an AOM or EOM.

FIG. 9 shows an alternative optical arrangement in which only a single modulated beam 110 is used instead of two modulated beams 40a,b as above. In this example the angle of incidence of the beam 110 into the lens 48 is switched between two angles 112, 114 by a modulator 111 so as to sequentially illuminate the probe with the beam 110 at two different locations on the probe. The modulator 111 is preferably an electro-optical-modulator or an acousto-optical-modulator. The modulator 111 is able to switch the angle sufficiently frequently that the probe does not cool down significantly between illuminations cycles at each angle. For instance the switching time between locations on the probe is preferably less than the thermal time constant of the locations on the probe. When the beam 110 is directed at the angle 112 then it is modulated to deflect the probe to follow the profile of the sample, and when it is directed at the angle 114 it is modulated to oscillate the probe.

In the example above the beam 110 is modulated synchronously with the location being addressed by the beam. That is, when the beam 110 is directed at the angle 112 a first modulation is applied to vary the intensity of the beam, and when the beam is directed at the angle 114 a second modulation is applied to vary the intensity of the beam. In an alternative example the intensity of the beam 110 may not be modulated, but instead the heating of the two locations can be modulated by controlling the amount of time that the beam spends at each location, in a similar manner to pulse-width modulation. That is, as the beam switches between the two locations the amount of time that it spends at each location can be varied over time, and thus the average power being transferred to each location will vary. In order to enable the two locations to be modulated independently, the beam may also be directed to a third location as part of the switching cycle, where that third location is either off the probe or part of the probe with no thermal response.

In a further alternative example the modulation of the beam 110 may not be varied synchronously with the location being addressed by the beam. In this example the beam 110 is continuously scanned over the surface of the cantilever for the purpose of distributing energy over a wide area rather than for the purpose of heating two locations differently. The intensity of the beam 110 is modulated as it scans over the surface (for instance for the purpose of oscillating the probe) but the intensity of the beam 110 is not modulated synchronously with the scanning motion. In other words it is not modulated at a first one of the locations in accordance with a first drive signal and at a second one of the locations in accordance with a second drive signal—rather it is modulated in accordance with a single drive signal only (for instance a sine wave of constant frequency) regardless of the angle of the beam.

For ease of illustration, in the embodiment of FIG. 9 the detection beam is not shown. However a detection beam will also be required, along with various other additional items shown in FIG. 2. The modulator 111 replaces items 42, 44a and 44c in FIG. 2. Thus the tracking system 24 is not replaced by the modulator 111, so the mirror 56 continues to be used to track the raster scanning motion of the probe.

As noted previously, probe motion in the z direction during a conventional AFM scan comprises two components: an oscillating component that is used to monitor probe—sample interaction and a z positioning component that is used to adjust probe—sample separation in response to a feedback signal in order to ensure that average interaction strength is maintained at a constant level. In the FIG. 1 embodiment of this invention, a single actuation system is used to drive all probe motion in the z direction. The feedback component of the drive signal is used to construct the image.

In the above-described embodiments the height detection system 26 was based on deflection detection using an optical lever (which measures the angle of the probe). Alternative height detection systems, for example those based on interferometry, may also be used. Such a detection system includes a light source that emits a laser beam, which is focused onto an upper surface of the tip end of the cantilever, and a reference beam, which is reflected from an upper surface of the stage. On reflection, these light beams propagate to a probe height detector, which includes an interferometer. The laser light is sufficiently coherent that an interference pattern is generated between the light reflected from the cantilever and the reference beam. This provides a measure of a path difference or change in the path difference between the two beams and hence an indication of the instantaneous height of the back of the cantilever above the stage surface.

The position of the spot 40c (directly above the probe tip in FIGS. 4, 6 and 7) is particularly preferred for the case where the detection system 16 is an interferometric detection system which directly measures the height of the tip of the probe. However if the detection system 16 is an optical lever (which measures the angle of the probe) then the position of the detection spot 40c is less critical, for example it can be placed anywhere across the cross bar 76 for the T-shaped probe as in the case of FIG. 6.

Although the invention has been described above with reference to one or more preferred embodiments, it will be appreciated that various changes or modifications may be made without departing from the scope of the invention as defined in the appended claims.

The invention claimed is:

1. An actuation system for driving a probe of a scanning probe microscope, the system comprising: an optical system arranged to illuminate the probe at two or more locations on the probe; and a modulation system arranged to modulate the intensity of the illumination differently at the two or more locations.

2. The actuation system of claim 1 wherein the optical system is arranged to simultaneously illuminate the probe at the two or more locations on the probe.

3. The actuation system of claim 1 wherein the optical system comprises a lens arranged to receive first and second beams and direct them onto the probe at first and second locations.

4. The actuation system of claim 3 wherein the first and second beams enter the lens at different angles of incidence relative to its optical axis whereby they are directed by the lens onto the probe at different locations.

5. The actuation system of claim 1 wherein the optical system comprises a beam combiner arranged to receive and combine first and second beams and direct the combined beams towards the probe to illuminate the probe.

6. The actuation system of claim 5 wherein the beams have different characteristics such that the beam combiner reflects one of the beams and transmits the other.

7. The actuation system of claim 1 further comprising a tracking system for moving a beam so as to track movement of the probe, thereby maintaining the locations at which the probe is illuminated.

8. The actuation system of claim 1 wherein the optical system is arranged to move a beam so as to sequentially illuminate the probe with the beam at the two or more locations on the probe.

9. The actuation system of claim 8 wherein the optical system comprises a lens arranged to receive the beam and focus it onto the probe; and an electro-optical-modulator or an acousto-optical-modulator which is arranged to sequentially vary the angle of incidence at which the beam enters the lens relative to its optical axis.

10. The actuation system of claim 1 wherein the modulation system is arranged to modulate the intensity of the illumination at a first one of the locations in accordance with a first drive signal, and the modulation system is arranged to modulate the intensity of the illumination at a second one of the locations in accordance with a second drive signal which is different to the first drive signal.

11. The actuation system of claim 1 wherein the modulation system is arranged to modulate the intensity of the illumination at a first one of the locations to oscillate the probe, and the modulation system is arranged to modulate the intensity of the illumination at a second one of the locations to select the probe by lowering it out of the plane of an array of probes.

12. An actuation system for driving a probe of a scanning probe microscope, the system comprising: an optical system arranged to move a beam so as to sequentially illuminate the probe with the beam at two or more locations on the probe; and a modulation system arranged to modulate the intensity of the beam.

13. A scanning probe microscope comprising a probe; and an actuation system according to claim 1.

14. The microscope of claim 13 wherein the optical system is arranged to illuminate the probe at the two or more locations on the probe so as to heat the probe and cause the probe to deform by the photothermal effect.

15. The microscope of claim 13 wherein the probe comprises two or more materials with different thermal expansion coefficients which are arranged so that each beam heats the probe and causes the probe to deform by the photothermal effect.

16. The microscope of claim 13 further comprising a probe support; wherein the probe has a relatively wide proximal portion adjacent to the probe support and a relative narrow distal portion remote from the probe support; and wherein the optical system is arranged to illuminate the proximal portion of the probe and the distal portion of the probe.

17. The actuation system of claim 11 wherein a maximum amplitude of deflection of the probe tip caused by the oscillation is at least ten times smaller than an amplitude of deflection of the probe caused by lowering it out of the plane of the array of probes.

18. An actuation system for driving a probe of a scanning probe microscope, the system comprising: a modulation system arranged to modulate the intensities of first and second radiation beams; and an optical system arranged to simultaneously direct the beams onto the probe.

19. The actuation system of claim 18 wherein the modulation system is arranged to modulate the intensity of the first and second beams differently.

20. The actuation system of claim 18 wherein the system is configured to controllably move a tip of the probe via the beams of radiation.

* * * * *